No. 865,388. PATENTED SEPT. 10, 1907.
E. HILL.
CONTROL OF AN ELECTRICALLY DRIVEN AIR COMPRESSOR.
APPLICATION FILED APR. 1, 1907.

4 SHEETS—SHEET 1.

Witnesses.
Lena C. Berry
Josiah H. Eck

Inventor.
Ebenezer Hill by
Harry P. Williams
atty.

No. 865,388. PATENTED SEPT. 10, 1907.
E. HILL.
CONTROL OF AN ELECTRICALLY DRIVEN AIR COMPRESSOR.
APPLICATION FILED APR. 1, 1907.

4 SHEETS—SHEET 2.

Witnesses.
Lena C. Berry
Josiah H Peck

Inventor.
Ebenezer Hill
by
Harry P. Williams
atty.

No. 865,388. PATENTED SEPT. 10, 1907.
E. HILL.
CONTROL OF AN ELECTRICALLY DRIVEN AIR COMPRESSOR.
APPLICATION FILED APR. 1, 1907.

4 SHEETS—SHEET 3.

Witnesses.
Lena C. Berry.
Josiah H. Eck

Inventor.
Ebenezer Hill, by
Harry R. Williams
Atty

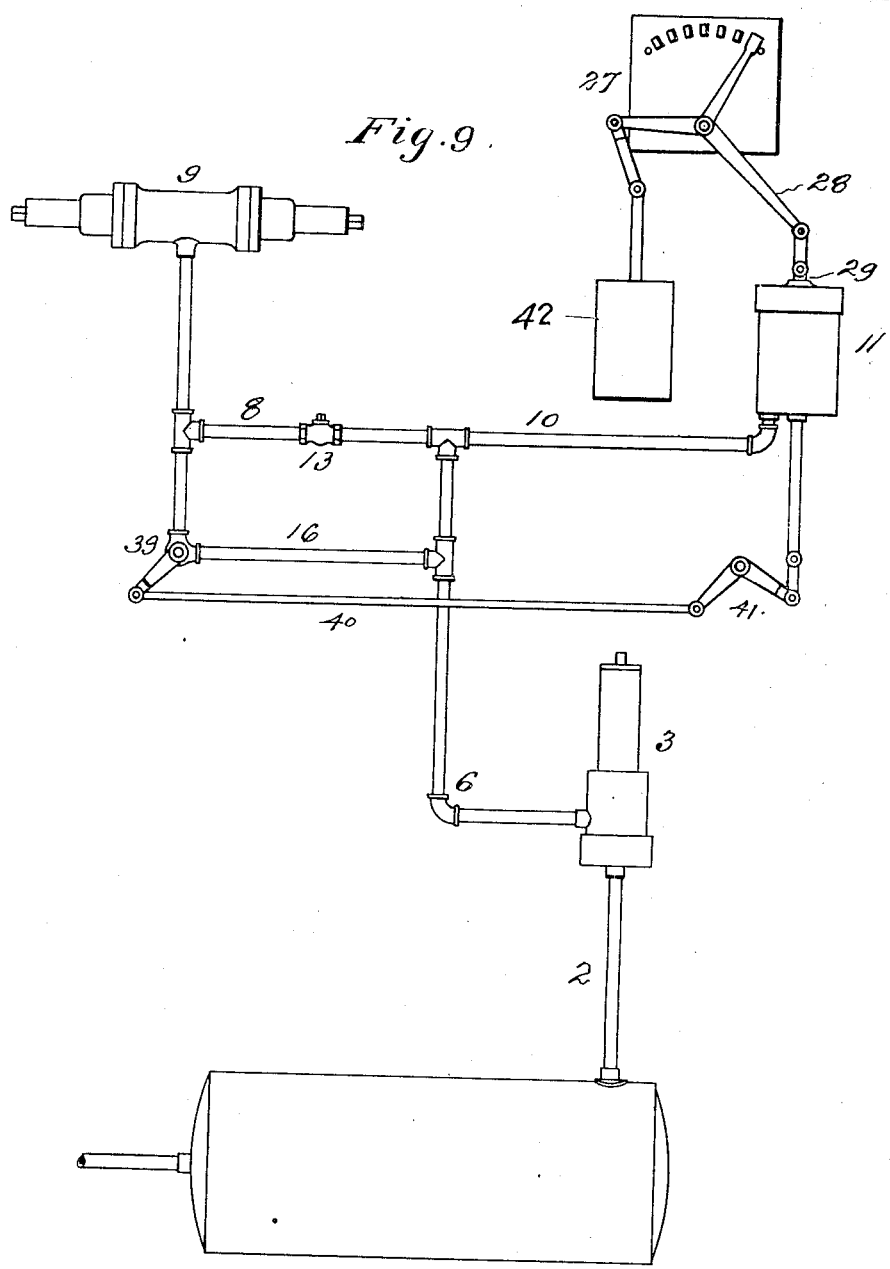

UNITED STATES PATENT OFFICE.

EBENEZER HILL, OF NORWALK, CONNECTICUT.

CONTROL OF AN ELECTRICALLY-DRIVEN AIR-COMPRESSOR.

No. 865,388.        Specification of Letters Patent.        Patented Sept. 10, 1907.

Application filed April 1, 1907. Serial No. 365,877.

*To all whom it may concern:*

Be it known that I, EBENEZER HILL, a citizen of the United States, residing at Norwalk, in the county of Fairfield and State of Connecticut, have invented a new and useful Control of an Electrically-Driven Air-Compressor, of which the following is a specification.

This invention relates to an apparatus for controlling an electrically-driven air compressor which is designed to supply air at different rates according to demand.
With machines of this character when the air pressure reaches a predetermined degree the compressor should temporarily cease furnishing air, and during this period should either be run slowly or stopped altogether, and then be automatically started and speeded up when the demand for air again occurs and the pressure drops. It is very desirable that an electrically-driven compressor should be started without any load, that is, without being required to perform any work, as many electric motors are comparatively powerless until they reach working speed.

The object of this invention is to arrange an apparatus which will unload or relieve an electrically-driven compressor of work by rendering its valves ineffective and stop or slow it down by controlling the electric current, at practically the same moment when the pressure of the air which it has compressed reaches a predetermined degree, and will automatically turn on the electric current and release the compressor valves when the air pressure drops, in such a manner that the motor and compressor will resume running at working or nearly working speed before the load is again taken up and the compressor begins to compress more air.

Figure 1:
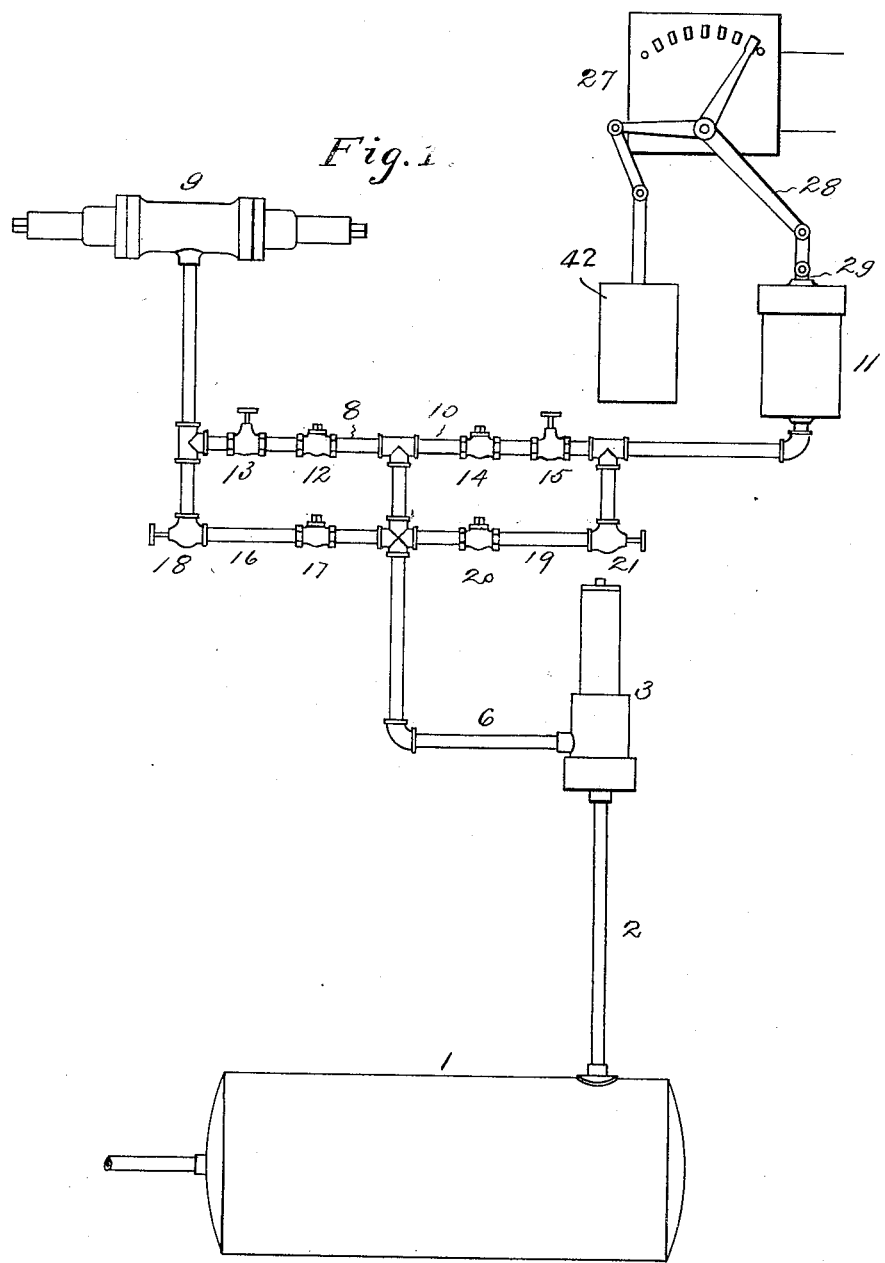
Figure 2:
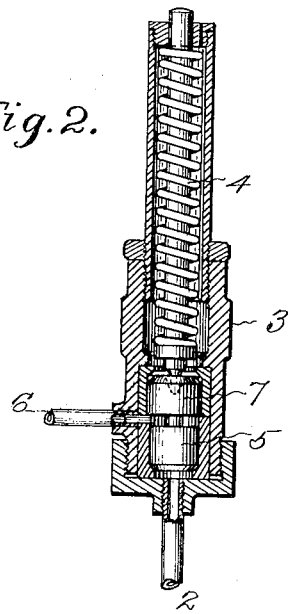
Figure 3:
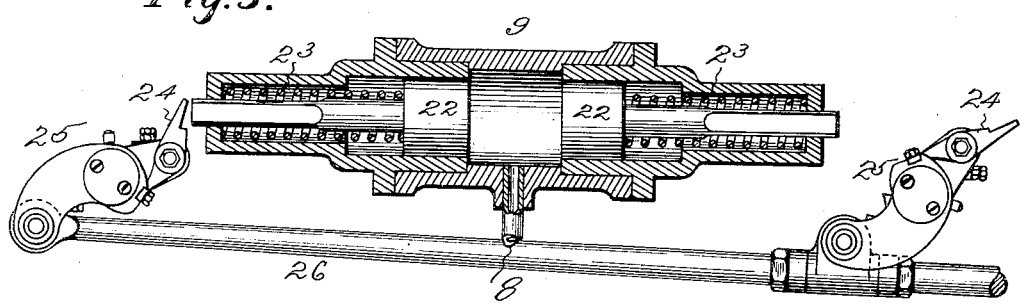
Figure 10:
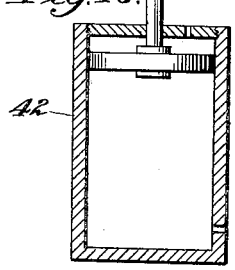
Figure 4:
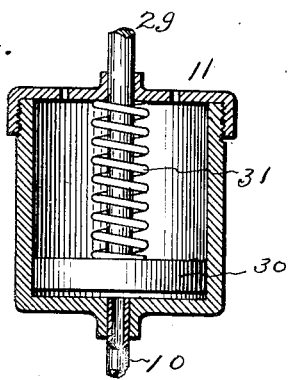
Figure 5:
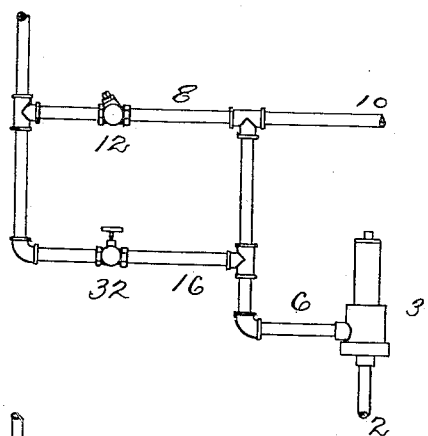
Figure 6:
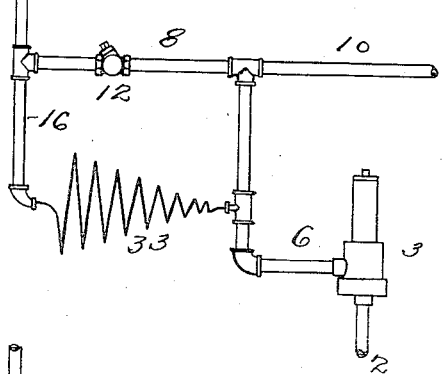
Figure 7:
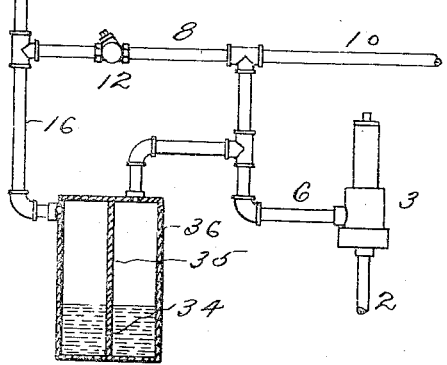
Figure 8:
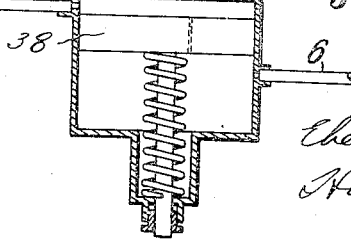

Figure 1 of the accompanying illustrations shows a diagrammatic view of an apparatus which embodies this invention and which will accomplish the above mentioned object, the motor and compressor being omitted for they are of common construction and form no part of the present invention. Fig. 2 shows a sectional view of the valve which controls the flow of air to the apparatus which is illustrated and which hereinafter will be termed the air control. Fig. 3 shows a sectional view of the device which is utilized to relieve the compressor of work when the air pressure in the main reservoir reaches the predetermined degree and which will be termed the compressor unloader. Fig. 4 shows a sectional view of the device for moving the rheostat or starter and controller for the electric motor and which will be termed the motor regulator. Fig. 5 shows a diagrammatic view of a modified arrangement of piping which will carry out the object of this invention. Fig. 6 shows another modification. Fig. 7 shows another modification. Fig. 8 shows still another modification. Fig. 9 still another modification. Fig. 10 shows a sectional view on large scale of the dash-pot shown in Fig. 1.

The cylinder, 1, which is illustrated represents the main reservoir of the system into which air is forced by the normal action of the compressor. Connected with the reservoir by a pipe 2 is the air control 3. The air control illustrated is of the type shown and described in Letters Patent No. 844,802 granted to me February 19, 1907, and is designed to be opened by the air when the pressure in the main reservoir reaches the predetermined degree.

The air under pressure, which is to be utilized to cause the operation of the apparatus, enters the casing of the air control from the pipe 2 and when the pressure is sufficiently great to overcome the pressure of the spring 4 the loosely fitting pressure valve 5 is lifted from its seat and the air flows through the casing about the valve into the pipe 6. In this form when the pressure valve is lifted and opened the loosely fitting secondary valve 7 is raised and closed against its seat and held closed until the pressure drops sufficiently for the spring to thrust both the valves down and close the passage through the casing.

The pipe 6 leading from the air control communicates by a branch 8 with the compressor unloader 9 and by a branch 10 with the motor regulator 11. In the branch 8 of the apparatus first shown is a check valve 12 arranged to permit the flow of air to the unloader but to prevent its return, and in this branch it is desirable, although not necessary, to arrange a throttle valve 13. In the branch 10 a check valve 14 is arranged to permit the flow of air to the motor regulator but to prevent the flow of air from the motor regulator, and in this branch there is also preferably, but not necessarily, a throttle valve 15.

Leading from the pipe 6 to the branch 8 around the check and throttle valves is a pipe 16. In this pipe is a check valve 17 that is arranged to permit the flow of air from the unloader but not to the unloader, and there is a throttle valve 18 which can be opened or closed more or less to regulate the amount of air that will flow through this branch. Leading from the pipe 6 to the branch 10 around the check and throttle valves is a pipe 19. In this pipe a check valve 20 is arranged to permit the flow of air from but not to the motor regulator. And in this by-pass there is also a throttle valve 21 for determining the area of the fluid passage.

The compressor unloader, 9, illustrated, is of the type which is shown and described in the Letters Patent No. 844,802 granted to me Feb. 19, 1907 above referred to. In that patent the air control and the unloading device are shown as a single piece of apparatus. In carrying out this invention they could be built as one piece of apparatus, as shown therein, but they are shown herein as separate pieces of apparatus for the purpose of clearness in illustrating and describing the parts and action of the parts which constitute the embodiment of the present invention. In this unloader when air pressure enters from the branch 8 and is exerted between the pistons 22 those pistons are forced outwardly against the springs 23. When the pistons are forced out the ends of the piston rods are moved into position to be engaged by the latches 24 which connect and render effective the mechanism 25 which actuates the compressor valves. When these latches are engaged by the piston rods they disconnect the valve operating mechanism so that the compressor valves will remain open, the valve rod 26 then continuing to reciprocate as usual but not actuating the valves until the pistons are drawn inwardly and the latches are permitted to connect the valve operating mechanism and the valve stems, as fully described in my prior patent referred to. When the valves are left open the compressor operates in the well known manner without effecting any work, that is, the air simply flows back and forth past the open valves as the compressor piston reciprocates without being forced forwardly and compressed.

The electric controller or rheostat 27 is of common form and arrangement and is connected as usual with an ordinary electric motor. The lever 28 of the controller is connected with the rod 29 attached to a piston 30 in the motor regulator cylinder 11. The pipe 10 opens into the cylinder beneath the piston and when air under pressure enters the cylinder from this pipe the piston is moved so as to turn the controller contact backwardly to the desired position, which may be such as to permit the motor to run slowly or to cut out the current and cause the motor to stop. Above the piston in the cylinder is a spring 31 which forces the piston downwardly when it is not overcome by air pressure, and draws the controller contact forward to the necessary position to cause the motor to run at the required working speed. A dash pot 42 is usually connected with the controller lever to cause it to move properly.

When the air in the main reservoir reaches the predetermined degree the air controlling valve opens and allows the air pressure to pass through the pipe 6 and branch 8 to the compressor unloader and through the branch 10 to the motor regulator. The air pressure in the unloader forces out the pistons and causes the compressor valves to be held open, as described, so that the compressor will do no work, although the compressor piston may continue to reciprocate, and the air pressure in the motor regulator lifts the piston and causes the controller contact to be turned back to such position that the motor will stop or will run slowly. These conditions continue as long as the pressure remains at the predetermined point. One or the other of these operations, that is the action of the unloader or the action of the motor regulator, may be delayed a little by means of the throttle valves in the branches 8 and 10 which may be opened or closed so as to obtain the necessary relative areas of the passages through these branches to accomplish the desired result.

When the air pressure in the reservoir begins to fall, as the result of drawing off of air for use, and it is necessary that the electricity be turned on and the motor and compressor started up it is desirable that the compressor attain full or nearly full speed before it resumes its operation of compressing air. When the pressure in the reservoir drops the air controlling valve closes the passage to the branches which lead to the compressor unloader and to the motor regulator, this action of the air controlling valve opens a passage through it, in the common manner, to the atmosphere. This empties the pipes of air so that the spring in the motor regulator will depress the piston and turn on the current, and at the same time the unloader will be emptied of air so that the compressor will resume its operation of compressing air.

By throttling the branch 16 more than the branch 19 by means of the throttle valves shown in these branches it is evident that the return of air from the unloader to the air controlling valve and atmosphere, can be delayed with relation to the return of air from the motor regulator, to any degree. Therefore by this means the action of the unloader may be delayed until the motor is started up and the compressor is running at or nearly at its normal speed before the unloader fully operates to permit the compressor to perform its work.

The apparatus may be arranged without any valves in the branch 10 for controlling the flow of air to and from the motor regulator. In this case, as illustrated in Fig. 5, the retardation of the unloader is accomplished by restricting the flow of air from the unloader, by means of the throttle valve 32 in the by-pass 16 through which the air escapes from the unloader when the pressure falls. The retardation of the action of the unloader could also be effected by arranging a long coil of small pipe 33 in place of a throttle valve in the by-pass, as shown in Fig. 6. In this case the air would escape more slowly from the unloader than from the electrical control and thus the latter would operate more quickly than the former and start the motor before loading the compressor.

In the form of retarding means shown in Fig. 7 liquid is forced through a small hole 34 in a partition or diaphragm 35 in a chamber 36 connected with the by-pass or return pipe from the unloader. With this arrangement the air escapes slowly for relieving the unloader, allowing the motor time to gain speed before the compressor has to perform work. This retardation can also be accomplished by arranging a dash pot 37 in the return or by-pass from the unloader, as illustrated in Fig. 8. In this case the air must first force down the plunger 38 before it can escape sufficiently to relieve the unloader of pressure. The throttle can be a cock 39 which may be connected by a link 40 with a bell crank 41 that is connected with the piston of the motor regulator, as shown in Fig. 9. When the piston is down and the current is on the cock is open. As this piston rises to shut off the current the cock is closed, and remains so until after the current is turned on by the dropping of the piston under the reduced pressure.

In all the forms of the apparatus illustrated one means are utilized both for actuating the compressor unloader and the electric motor regulator, and yet while both are relieved by the one means at the same instant the escape of air from the unloader is retarded so that the motor has time to start up and reach effective speed before the compressor is required to do work.

The invention claimed is:—

1. The combination of an air control, a compressor unloader, a motor regulator, pipes connecting the air control with the unloader and the regulator, and check valves for controlling the flow of air through said pipes, substantially as specified.

2. The combination of an air control, a compressor unloader, a motor regulator, pipes connecting the air control with the unloader and the regulator, and throttle valves for controlling the flow of air through said pipes, substantially as specified.

3. The combination of an air control, a compressor unloader, a motor regulator, pipes connecting the air control with the unloader and the regulator, check valves and throttle valves for controlling the flow of air through said pipes, substantially as specified.

4. The combination of an air control, a compressor unloader, a motor regulator, pipes connecting the air control with the unloader and regulator, a check valve for controlling the flow of air through said pipes to the unloader and means for retarding the flow of air from the unloader, substantially as specified.

5. The combination of an air control, a compressor unloader, a motor regulator, pipes connecting the air control with the unloader and the regulator, a check valve in the pipe leading from the air control to the unloader, a by-pass around the check valve, and means in the by-pass for retarding the flow of air through said by-pass, substantially as specified.

6. The combination of an air control, a compressor unloader, a motor regulator, pipes connecting the air control with the unloader and the regulator whereby air flowing through the air control will act simultaneously upon the unloader and regulator, and means for retarding the movement of the unloader, substantially as specified.

7. The combination of an air control, a compressor unloader, a motor regulator, pipes connecting the air control with the unloader and regulator whereby the unloader and regulator are actuated simultaneously when the air control opens, and means which retard the actuation of the unloader with relation to the regulator when the air control closes, substantially as specified.

EBENEZER HILL.

Witnesses:
E. HILL, Jr.,
J. E. SLATER.